(12) United States Patent
Colavin et al.

(10) Patent No.: US 7,064,783 B2
(45) Date of Patent: Jun. 20, 2006

(54) STILL PICTURE FORMAT FOR SUBSEQUENT PICTURE STITCHING FOR FORMING A PANORAMIC IMAGE

(75) Inventors: Osvaldo M. Colavin, San Diego, CA (US); Emmanuel Lusinchi, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 679 days.

(21) Appl. No.: 10/053,222

(22) Filed: Oct. 23, 2001

(65) Prior Publication Data
US 2002/0140829 A1    Oct. 3, 2002

Related U.S. Application Data

(63) Continuation-in-part of application No. 09/477,037, filed on Dec. 31, 1999, now Pat. No. 6,771,304.

(51) Int. Cl.
H04N 5/76 (2006.01)
(52) U.S. Cl. .................. 348/231.3; 348/36; 348/231.6
(58) Field of Classification Search ............. 348/218.1, 348/584, 36, 39, 231.1, 231.2, 173, 171, 348/231.3, 231.6; 375/240.08; 352/69
See application file for complete search history.

(56) References Cited

U.S. PATENT DOCUMENTS

| | | | | |
|---|---|---|---|---|
| 5,138,460 A | * | 8/1992 | Egawa | 348/239 |
| 5,262,867 A | * | 11/1993 | Kojima | 348/39 |
| 5,682,197 A | * | 10/1997 | Moghadam et al. | 348/36 |
| 5,724,579 A | * | 3/1998 | Suzuki | 707/104.1 |
| 5,903,309 A | * | 5/1999 | Anderson | 348/333.02 |
| 5,940,641 A | | 8/1999 | McIntyre et al. | |
| 5,959,669 A | * | 9/1999 | Mizoguchi et al. | 348/362 |
| 6,493,028 B1 | * | 12/2002 | Anderson et al. | 348/222.1 |
| 6,549,681 B1 | * | 4/2003 | Takahashi et al. | 382/294 |
| 6,552,744 B1 | * | 4/2003 | Chen | 348/218.1 |
| 6,677,981 B1 | * | 1/2004 | Mancuso et al. | 348/36 |
| 6,714,249 B1 | * | 3/2004 | May et al. | 348/373 |
| 6,771,304 B1 | * | 8/2004 | Mancuso et al. | 348/39 |
| 6,801,219 B1 | * | 10/2004 | Colavin | 345/684 |
| 6,812,961 B1 | * | 11/2004 | Parulski et al. | 348/231.2 |

* cited by examiner

*Primary Examiner*—Ngoc-Yen Vu
*Assistant Examiner*—Gary C. Vieaux
(74) *Attorney, Agent, or Firm*—Stephen C. Bongini; Lisa K. Jorgenson

(57) ABSTRACT

A method for storing a plurality of still images to form a panoramic image. The method comprising the steps of receiving a first image forming a part of a series of images to form a panoramic image and storing the first image in memory. When one or more subsequent images after the first image are received the steps of calculating one or more panoramic parameters between a current image and a previous image stored in memory and storing the current image with the one or more panoramic parameters in memory are performed.

19 Claims, 9 Drawing Sheets

STILL PICTURE FORMAT FOR SUBSEQUENT PICTURE STITCHING FOR FORMING A PANORAMIC IMAGE

CROSS REFERENCE TO RELATED APPLICATIONS

This application is a continuation-in-part of a non-provisional patent application Ser. No. 09/477,037 filed on Dec. 31, 1999 now issued as U.S. Pat. No. 6,771,304, entitled "Perspective Correction For Panoramic Digital Camera" with inventors Massimo Mancuso et al., which is commonly assigned herewith to STMicroelectronics, Inc. and which is hereby incorporated by reference in its entirety.

In addition, the present application relates to technology similar to U.S. patent application Ser. No. 09/920,026, now issued as U.S. Pat. No. 6,801,219, entitled "Method And Apparatus Using A Two-Dimensional Circular Data Buffer For Scrollable Image Display" with inventor Osvaldo M. Colavin and commonly assigned herewith to STMicroelectronics Inc. and which is hereby incorporated by reference in its entirety herein.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

This invention disclosed broadly relates to the field of image processing and more specifically to image processing in a digital camera for taking, storing and displaying panoramic pictures.

2. Description of the Related Art

Today, panoramic photography is accomplished in various ways. One is to use a still camera mounted on a tripod to take a succession of shots as the camera is pivoted around the tripod. In some cameras, a wider than usual strip of film is exposed with special movable optics.

In other cameras, conventional format film, such as 35 mm film, is masked during the exposure in the camera to provide a panoramic effect. The effect is panoramic but the whole exposure is limited by the field of view through the lens.

Other techniques for creating panoramic photography include physically cutting and pasting together strips of exposed film by carefully aligning boundaries between edges of film.

The benefits of electronic photography have led to the growth of digital cameras, which, unlike their film-based counterparts, store images captured in memory into digital memory such as flash memory. To provide panoramic photography effects, these digital cameras can interface with personal computers for joining together two or more images into one image to provide a panoramic effect by joining edge boundaries of images. One such system is disclosed in U.S. Pat. No. 6,682,197, by named inventors Omid A. Moughadam, Stuart R. Ring, and John R. Squilla, entitled "Electronic Panoramic Camera For Use With An External Processor."

Complicated panoramic digital cameras are available that rely on position sensors or satellite communications for determining position coordinates. These position coordinates are used to help combine the panoramic images. The process of combining scenes taken from different camera orientations is known as "Image Stitching." One such system is disclosed in U.S. Pat. No. 5,262,867 by named inventor Kiyonobu Kojima entitled "Electronic Camera and Device for Panoramic Imaging and Object Searching" issued on Nov. 16, 1993.

A panoramic camera with a memory device for storing data from a previously photographed portion of an object and a control device for enabling the display device to substantially display both the image to be photographed and the image already photographed and stored in the memory space is described in U.S. Pat. No. 5,138,460 by named inventors Egawa and Akira entitled "Apparatus for forming Composite Images" issued on Aug. 11, 1992.

Other techniques for stitching two or more still images together are disclosed in the patent application Ser. No. 09/477,036 now issued as U.S. Pat. No. 6,677,981, entitled "Motion Play-Back of Still Picture Comprising A Panoramic View for Simulating Perspective" with inventors Massimo Mancuso et al, filed on Dec. 31, 1999, and commonly assigned herewith to STMicroelectronics, Inc. and hereby incorporated here into in its entirety. Each of the still images forming the panoramic image in this application is stored separately and the panoramic scene is reconstructed or stitched together each time it is needed. More specifically, the panorama image is built strip-by-strip as pictures are captured, each strip is stored individually, and the panoramic is built strip by strip as still images are captured. The panoramic scene is obtained by abutting the successive strips.

Although the prior art techniques described above are useful for panoramic capture techniques, these prior art techniques are not without their shortcomings. One shortcoming with the techniques above, is that additional memory is required to save the panoramic image separately from the original images composing the panorama. Accordingly, a need exists for a method and system to store images that requires minimum memory size to store the panoramic image or to provide the panoramic functionality without actually storing the panoramic image.

Another shortcoming is how the panoramic image is stored. Specifically, the prior art systems store the panoramic image in strips or in a format other than the complete panoramic image. A panoramic image format that is stored in strips or in a format other than the complete image is useful only for a stitching application. Other applications, such as, an electronic photo album, process each strip as a single image and displays each image separately. This displaying of each strip separately many times confuse the user since the entire panoramic is not displayed at once. Accordingly, a need exists for a method and a system to store still images in an image format that is compatible with other image formats such as JPEG.

Another shortcoming with the techniques above, is that pictures saved with original parameters such as motion estimation, color correction, focal length and other image stitching parameter are not compatible with popular storage formats such as JPEG (Joint Photographic Experts Group ISO standard 10918). In fact, along with the Graphic Interchange Format (GIF) file, the JPEG is a file type supported by the World Wide Web protocol. Accordingly, needs exists for a method and apparatus to store images with panoramic parameters in such a way that the image storage format is compatible with other still image formats such as JPEG.

Another shortcoming with the techniques above is that the user is left with very little choice for correcting imperfections in the panoramic image after it is captured if the parameters of motion estimation and color correction are lost. Accordingly, a need exists for a method and a system to reconstruct and stitched together still images forming a panoramic scene with more user control for correcting imperfections such as motion estimation and color correction.

SUMMARY OF THE INVENTION

A method for storing a plurality of still images to form a panoramic image. The method comprising the steps of receiving a first image forming a part of a series of images to form a panoramic image and storing the first image in memory. When one or more subsequent images after the first image are received the steps of calculating one or more panoramic parameters between a current image and a previous image stored in memory and storing the current image with the one or more panoramic parameters in memory are performed.

In an alternate embodiment, a system and computer readable medium corresponding to the above system is described.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
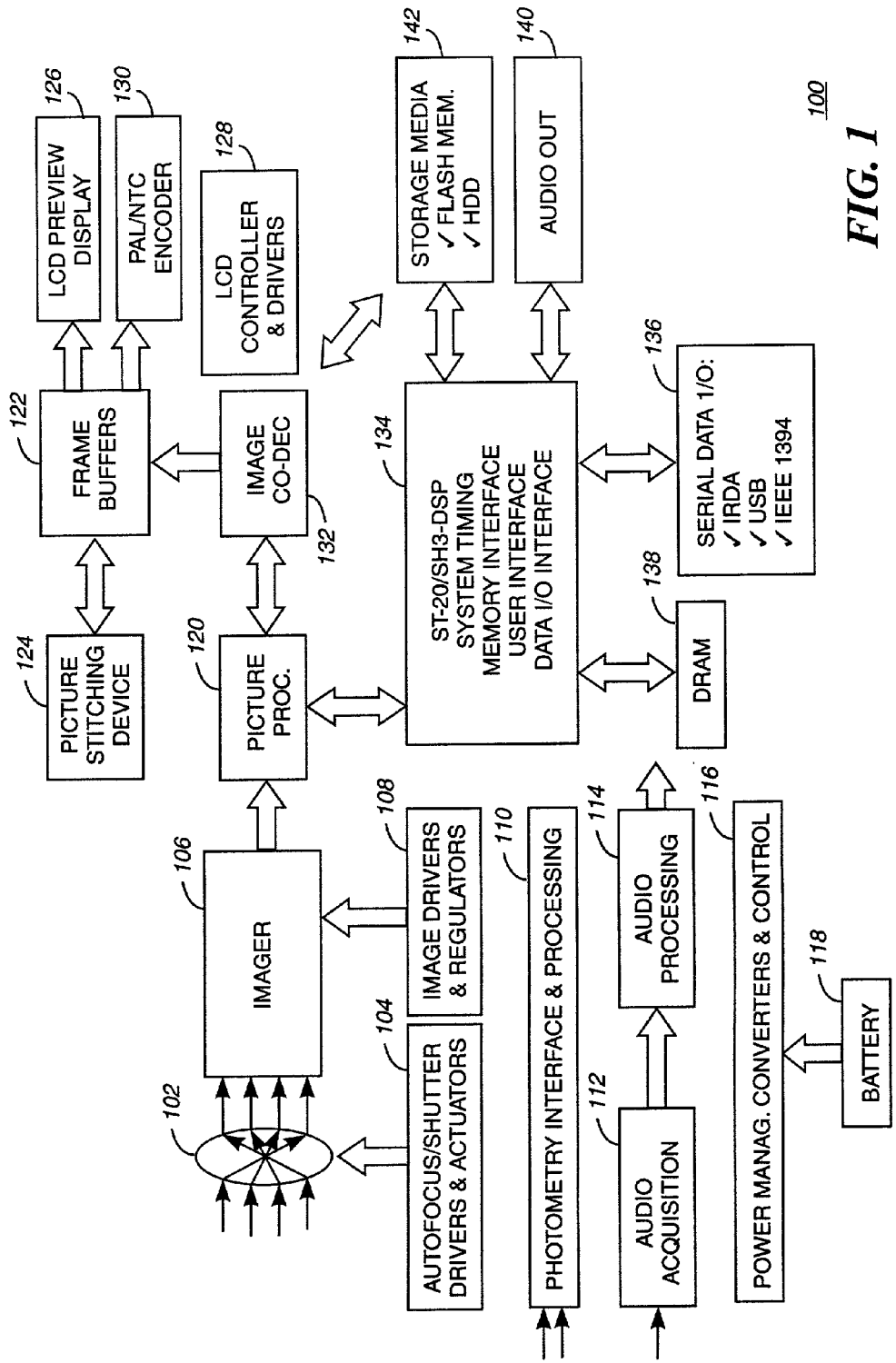
FIG. 1 is a block diagram of a digital still camera according to one aspect of the present invention.

In the drawing like numerals refer to like parts through several views. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Glossary of Terms Used in this Disclosure

Actual Next Picture—the picture that is actually captured as the next addition to the set of pictures constituting the Panorama.

Bottom-to-Top Vertical Panorama—a Panorama captured by taking a set of pictures by rotating the camera up (from bottom to top) between each capture, with as little horizontal displacement as possible.

Current Buffer—a cylindrically warped version of the current picture.

Current Picture/Current View/Current Frame—a picture displayed on the camera LCD screen and that is updated in real time. If the LCD screen is not used or if there is no LCD screen, it is the picture that would be captured at any given moment if the capture button was pressed.

Ideal Next Picture—in a Left-to-Right Horizontal Panorama, the picture that would be obtained if the camera was positioned so that the Previous Picture and Ideal Next Picture have an Overlay Part Length equal to the Set Overlay Part Length and no vertical displacement. In a Left-to-Right Horizontal Panorama, the overlay part is on the right of the Previous Picture and on the left of the Ideal Next Picture.

Ideal Position of the Camera for the Ideal Next Picture—The position of the camera that allows to capture the Ideal Next Picture.

Image Stitching—the process of digitally combining scenes taken from different camera orientations.

Left-to-Right Horizontal Panorama—a Panorama captured by taking a set of pictures by rotating the camera clockwise (from left to right) between each capture, with as little vertical displacement as possible.

Overlay Part Length—in a Horizontal Panorama, the width of the overlay part. It is expressed in term of percentage of the whole picture width.

Panoramic—an image with at least one dimension such as height or width that is greater in dimension of a single capturing device and often involves a series of images. A picture created from a set of pictures or images and that has at least one dimension bigger than the corresponding dimensions of a source picture.

Preview Strip—a computed image created through digital processing of the overlay part of the Previous Picture and that strives to predict what the overlay part of the Ideal Next Picture will look like.

Previous Picture/Previous Frame/Previous Image—a picture that has already been captured and that is the latest addition to the set of picture constituting the Panorama.

Right-to-Left Horizontal Panorama—a Panorama captured by taking a set of pictures by rotating the camera anti-clockwise (from right to left) between each capture, with as little vertical displacement as possible.

Set Overlay Part Length—a constant Overlay Part Length for each pair of pictures constituting the Panorama. The Set Overlay Part Length is the fixed length chosen for a given Panorama.

Top-to-Bottom Vertical Panorama—a Panorama captured by taking a set of pictures by rotating the camera down (from top to bottom) between each capture, with as little horizontal displacement as possible.

Viewport—a portion of the circular buffer which is currently being displayed to a user.

The viewport can occupy substantially all of the viewable area of the display, for viewing a panoramic scene being played back through the window.

Picture Stitching Camera

Referring now in more detail to the drawings in which like numerals refer to like parts throughout several views, shown in FIG. 1 is a block diagram of a digital still camera 100 according to one aspect of the present invention. A digital camera comprises one or more optical lenses 102 with an autofocus/shutter, driver and actuator 104 and associated photometry interface 108 such as autofocus, auto shutter and contrast control. An imager 106 such as a CCD or equivalent 104 converts an image projected through optical lens 102 to a series of pixels 106. Regulators and image drivers 108 allow regulation of the imager 106. An audio acquisition device 112, such as microphone, along with audio processing circuitry 114, allows a user to make aural recordings along with digital images. A battery 118 with power management circuitry 118 allows the camera 100 to work as a portable device. A picture processor 116, provides pixel information to one or more frame buffers 118 coupled to picture stitching device 120 which is described further below. In this embodiment, the picture stitching device 120 is implemented as an ASIC. A LCD display 122 or equivalent enables a user to view the image projected through lens 102 into imager 106 and controlled by LCD controller 134. A PAL/NTSC 124 encoder provides an interface to other display types. An image CODEC 132 coupled to picture processor 116 provides known image enhancement effects for the picture processor 116. A DSP 134 such a STMicroelectronics ST-20/SH3-DSP is used to control the memory interface and the data I/0 136 such at Infra-Red, Universal Serial Bus or other interfaces. A DRAM provides execution memory for the DSP 134 to perform Image Stitching algorithms as described below. An audio output 130 such as a speaker provides the user aural playback. All of these components are representative components of the digital camera 100. Storage media 142 such as Flash memory, diskettes or removable hard drives store each image and associated audio. In one embodiment, the algorithms carrying out the steps for Image Stitching described below are stored on the storage media 142 along with captured images and audio. Processing for the images may occur prior to or after the image is stored in storage media 142. The general operation of a digital camera comprising most elements described herein is well understood by those skilled in the art.

One or more user inputs via the LCD Controller 128 provide user control over camera functions such as the orientation of the panoramic, e.g., horizontal or vertical, and the direction of movement such as a Left-to-Right Horizontal Panoramic, a Right-to-Left Horizontal Panoramic; a Top-to-Bottom Vertical Panoramic; and a Bottom-to-Top Vertical Panoramic. Other user input such as the optional features and desired effects and to set system parameters such as:

Panorama mode on/off.
Panorama parameters
Left-to-Right Horizontal mode.
Right-to-Left Horizontal mode.
Top-to-Bottom Vertical mode.
Bottom-to-Top Vertical mode.
Set Overlay Part Length.
Preview display on/off.
Mixing mode parameters.
Alpha blending on/off.
Alpha blending parameters such as alpha blending ratio.
Interlaced block mode on/off.
Interlaced block pattern selection.

Figure 2:
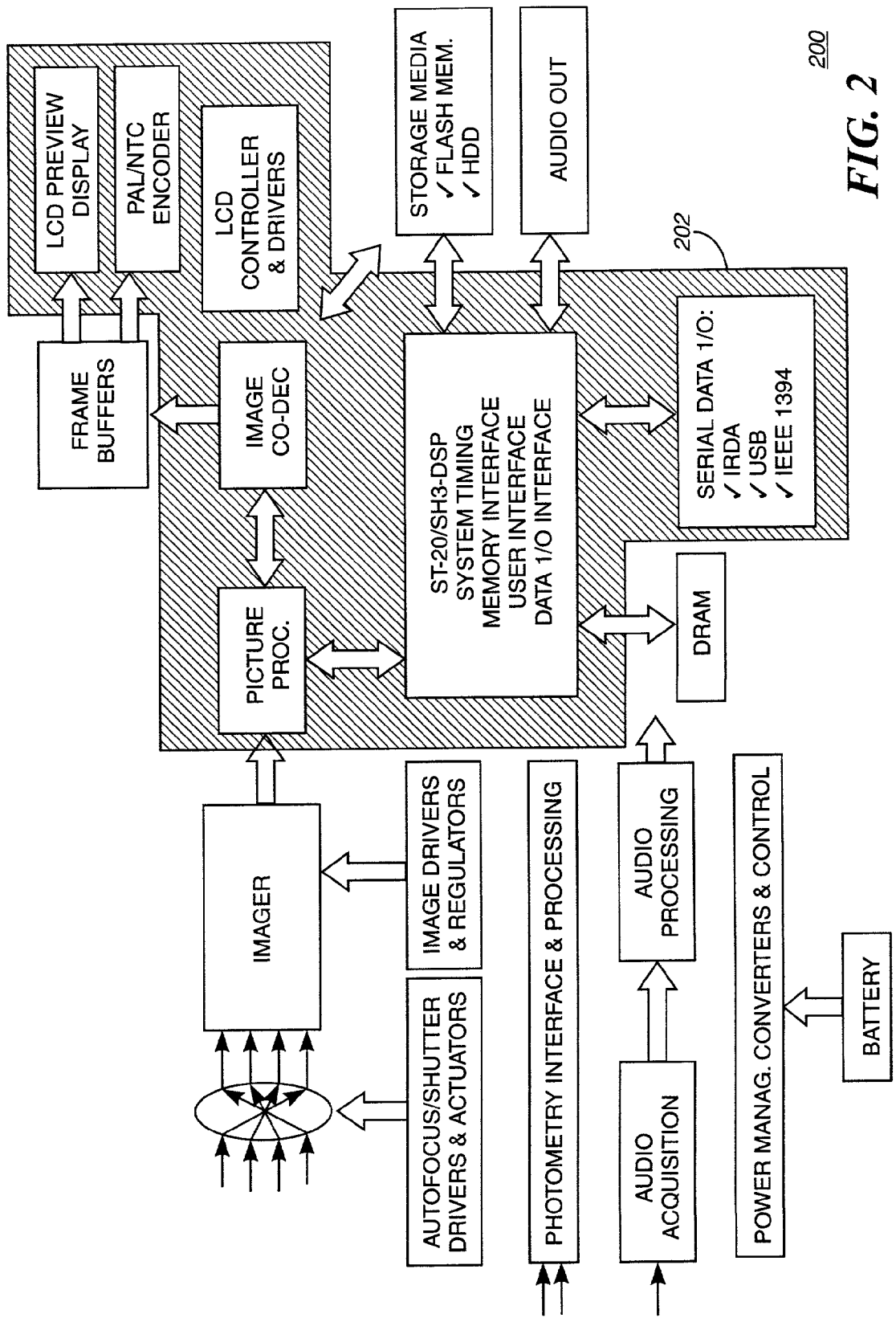
FIG. 2 is a block diagram of another embodiment of the digital still camera in which the picture-stitching device of FIG. 1 is integrated as a standard cell in a semi-custom semiconductor device, according to the present invention.

In another embodiment, many of the components of FIG. 1 are embedded in as part of a standard cell in a semi-custom semiconductor device. FIG. 2 is another embodiment of a still camera in which the picture stitching device of FIG. 1 is integrated as a standard cell in a semi-custom semiconductor device, according to the present invention. In this embodiment, the picture stitching device 124 and picture processor 120 are physically implemented as one unit. The DSP 134, serial I/O 136, image CODEC 132, LCD preview and display 126, PAL/NTSC encoder 130 and LCD controller & drivers 126 are all integrate as one device 200. To those skilled in the art, it will be obvious to substitute and modify this exemplary single device 200 to include the picture stitching device 124 and DSP 134 with other circuitry as well.

Panoramic Capturing Overview

Figure 3:
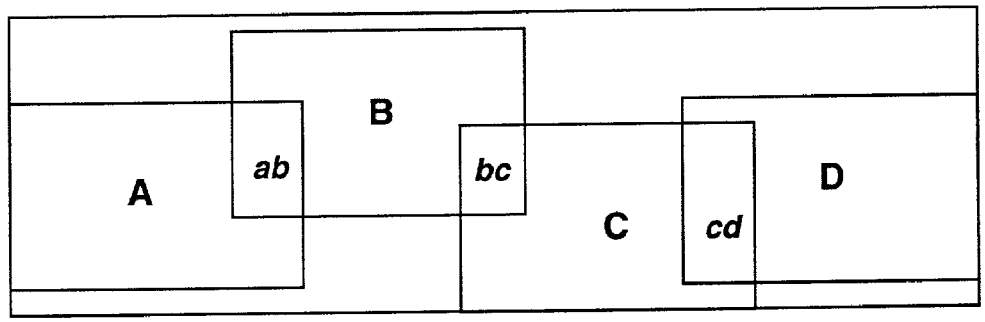
FIG. 3 is an illustration of a series of individual horizontal still images comprising a panoramic image with overlapping regions, according to the present invention.

Turning now to FIG. 3, shown is a series of four images 300 labeled A, B, C, and D with overlap edges parts ab, bc, cd between. These four images are joined together to form one Panoramic image. It is important to note that the Panoramic images can be from Left-to-Right as shown in FIG. 3 or Right-to-Left for a Horizontal Panoramic. For a Vertical Panoramic, (not shown) the series of images can run from top- to-bottom or from bottom-to-top. Accordingly, this present invention is not limited to one type of horizontal or vertical orientation, and four types of panoramic images are disclosed: a Left-To-Right Horizontal Panoramic; a Right-to-Left Horizontal Panoramic; a Top-to Bottom Vertical Panoramic; and a Bottom-to-Top Vertical Panoramic.

Figure 4:
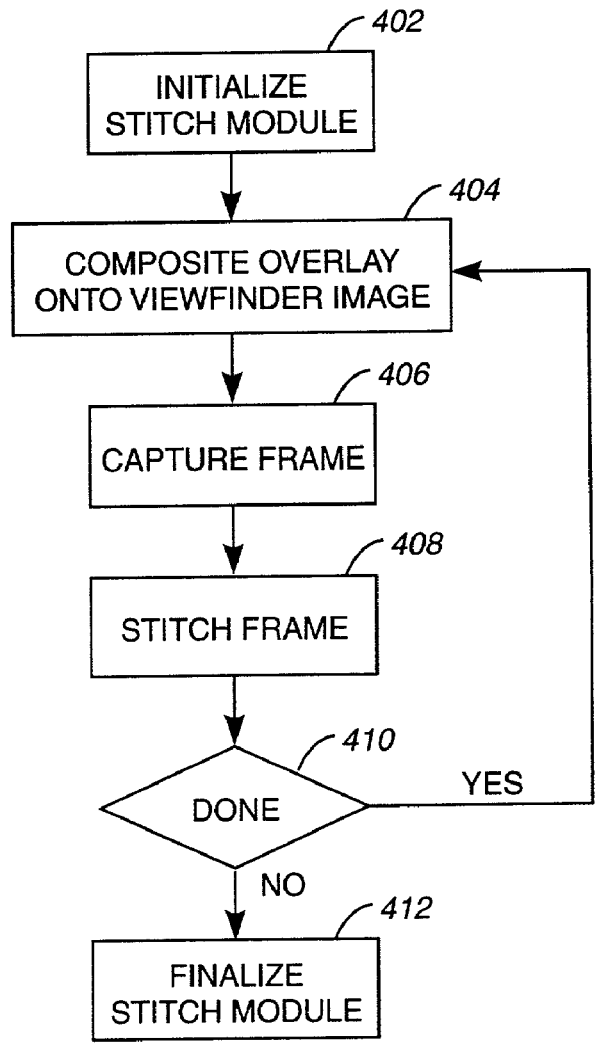
FIG. 4 is a flow diagram of the overall image acquisition process of the horizontal images of FIG. 3 using the digital still camera of FIG. 1, according to the present invention.

FIG. 4 is a flow diagram 400 of the overall image acquisition using the digital still camera of FIG. 1, according to the present invention. After this overall process is described, a more detailed description of the process steps of FIG. 4 are described below. The digital camera 100 acquires a series of images to form a panoramic image, such as the series of Left-To-Right Horizontal Panoramic A, B, C, D with overlap edge parts ab, bc, cd of FIG. 3. The overall image acquisition process begins with the initialization of the digital camera 100. The user inputs from the LCD controller 128 setting up the orientation of the panoramic, such as horizontal or vertical and other system parameters for picture stitching device 124 are set, step 402. The next image is located in the view finder of digital camera 100. Returning to the example in FIG. 3, if the image is A, it is the first image, if the image is B, C, or D it is the next image and the regions of overlap ab, bd, and cd for each image pair is made as a composite. Once r the first frame or the successive frames with the desired overlap are aligned in the view finder of digital camera 100, the so called Ideal Next Picture, is created. The region of overlap, called the Preview Strip, is a composite of both the Previous Picture and the Current Picture. The Preview Strip comprises a perspectively corrected Previous Picture in the region overlap. The Preview Strip assists the user in aligning the Current Picture and the Previous Picture. The Current View is stitched together with the Previous View, in the stitch frame step, 408. A test is made to see if the last image had been stitched. Referring again to FIG. 3, that is whether image D has been stitched with image C using overlap region cd. If the last image has not been stitched then the process returns to step 404 until the last image has been stitched, step 410. Once the last image is stitched, final corrections to the overall image and overall data is made, step 412. After the first frame is acquired, a perspectively-corrected strip of the Previous Frame is overlaid on the Current Frame to aid the user in acquiring the Current Frame. For example, if a Horizontal Panorama is being acquired from left-to-right, a strip from the right portion of the Previous Frame is perspectively corrected and overlaid on the left portion of the Current Frame in the viewfinder. After each frame is acquired, the stitch module is invoked with the new frame buffer. The stitch module aligns and blends the new frame into the Panorama, and incrementally saves out the Panorama. After the last frame is acquired and stitched, the Finalize Stitch module is called to save out any remaining data. In another embodiment, the present invention does not incrementally save out the Panorama, but rather as more fully described in the following sections the Panorama is not saved at all. Instead, the unmodified pictures are saved together with enough information to reconstruct the panorama quickly when needed.

Figure 5:
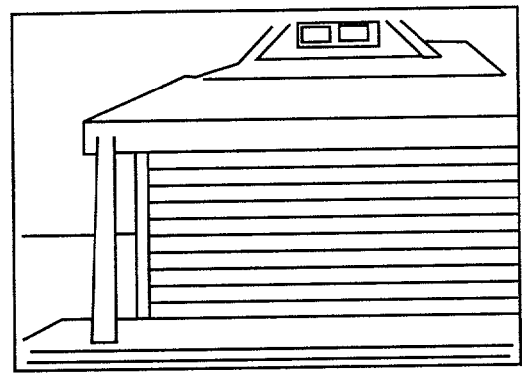
FIG. 5 is an illustration of a Previous Picture for demonstrating the composite overlay and perspective correction of the preview strip the overall image acquisition process of FIG. 4, according to the present invention.
Figure 6:
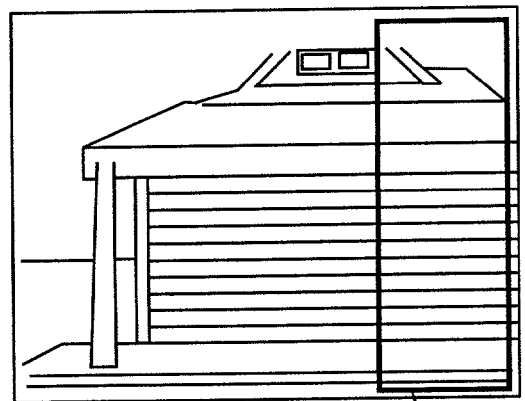
FIG. 6 is an illustration of a selected overlap region of FIG. 9, according to the present invention.
Figure 7:
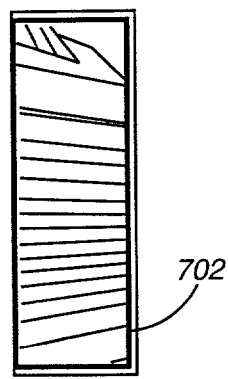
FIG. 7 is an illustration of the corrected perspective of overlap region of FIG. 6 for aligning the Ideal Next Picture, according to the invention.
Figure 8:
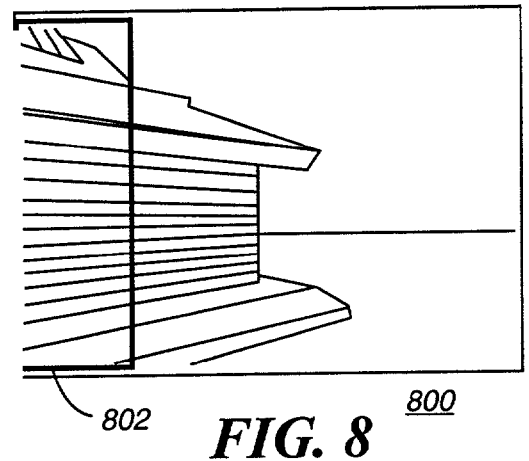
FIG. 8 is an illustration of the Current Picture with an Ideal Next Picture guided by the overlap generated in FIG. 7, according to the present invention.

Turning now to FIGS. 5–8 is an illustration of a series of Left-to-Right Horizontal Panorama images illustrating the perspective correction of FIG. 4 as seen by the user of the digital camera 100, according to the present invention. Note the capturing of the Current Picture with an Ideal Next Picture guided by the overlap generated edge 602. In FIG. 5, an image is captured in the digital camera 100, this becomes the Previous Picture 500. A Preview Area 602 is shown from the Previous Picture 500 in FIG. 6. FIG. 7 illustrates how the Preview Area 602 is perspectively corrected or warped 702 to assist the user in aligning the Current Picture 800 in FIG. 8. Notice the perspectively corrected Preview Area 702 makes aligning the Current Picture 800 much easier. As shown in FIG. 8, a Preview Strip 702 is generated from the overlay part 602 of the Previous Picture 500. Note the similarity between the generated Preview Strip 702 and the Current View 800 overlay part. The computed Preview strip 702 is used as a visual clue, displayed on the LCD 126 of digital camera 100, to help the user position the camera 100 until the Current View 800 matches the Preview Strip 702.

The computed Preview Strip 702 can be displayed on the digital camera 100 in various way to help the user in precisely placing the camera in the desired position. One way is to alpha blend (with adjustable coefficient) the preview with the current display of the scene on the LCD 126. In another embodiment, some blocks of the preview and some block of the display Current View are interlaced on the LCD display of digital camera 100.

Capturing and Saving the Panoramic Image

Figure 9:
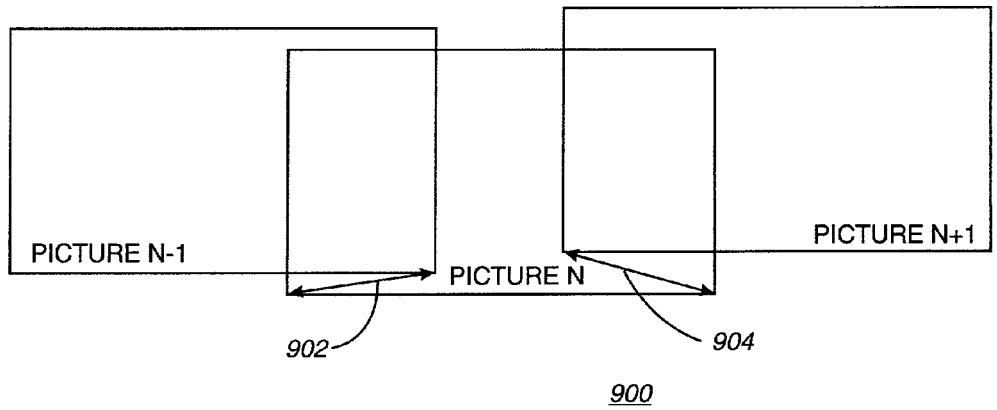
FIG. 9 is an illustration of a series of pictures captured of FIG. 3 that are saved according to the present invention.

FIG. 9 is an illustration 900 of a series of pictures captured of FIG. 3 that are saved according to the present invention. A series of still images N−1 . . . N . . . N+1 that form the panoramic image are shown. Two regions of overlap 902 and 904 are also shown. The pictures are saved as they are captured in the camera 100 together with the stitching information such as motion estimation and color correction.

More specifically, the following steps describe the details during panoramic capture and storage:

an interpolation such as bayer to RGB;
color space conversion such as RGB to YUV422;
optional down sampling depending on the camera settings, e.g., from sensor resolution to VGA;
optional digital zoom;
optional compression such as JPEG; and
storage in non volatile memory (floppy disk or flash memory based card).
At this point, it is assumed that a YUV version of the picture at the user selected resolution—typically the one available after digital zoom—is present in the system memory at the end of this step. unless this is the first picture in the panorama sequence, motion estimation is performed and color mismatch is evaluated between the picture just captured and the previously captured picture, both still resident in system memory in YUV format.
the resulting parameters motion vector and color/contrast correction factors are added to the compressed picture file, typically in a field reserved for extensions or comments, preserving the file compatibility with the format.

It is important to note that the present invention works equally well with other color space formats such as RGB. In fact, it is clear to those of average skill in the art that the methods described in the present invention can easily accommodate other picture representations, including unprocessed sensor information such as a bayer pattern.

Figure 14:
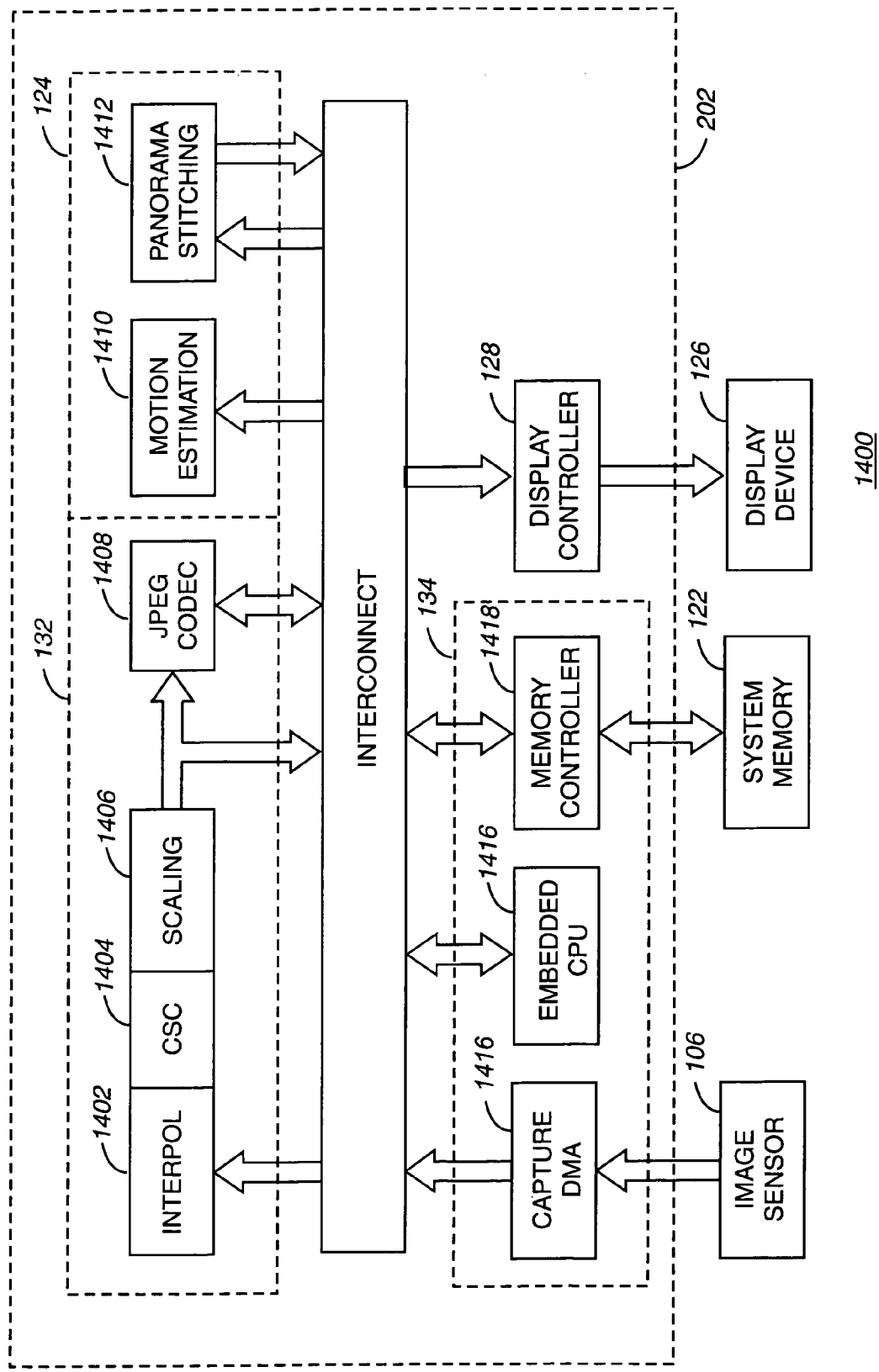
FIG. 14 is an exemplary block diagram of the major functions for the capture of the series of still images using the image capture and storage and panorama parameters computation of FIG. 10, according to the present invention.

FIG. 14 is an exemplary block diagram 1400 of the major functions for the capture of the series of still images using the image capture and storage and panorama parameters computation steps above. The major functional components of Image Codec 132 are further divided into functional block of interpolation 1402, color space conversion 1404, scaling 1406 and JPEG codec 1408. The major functional components of the Picture Stitching Device 124 are motion estimation 1410 and panorama stitching 1412. And in this example the major functional components of processor 134 is divided into DMA capture 1414, CPU 1416 and memory controller 1418. All of these components are known to those of average skill in the art and are commercially available.

Process Flow for Storage Format

Figure 10:
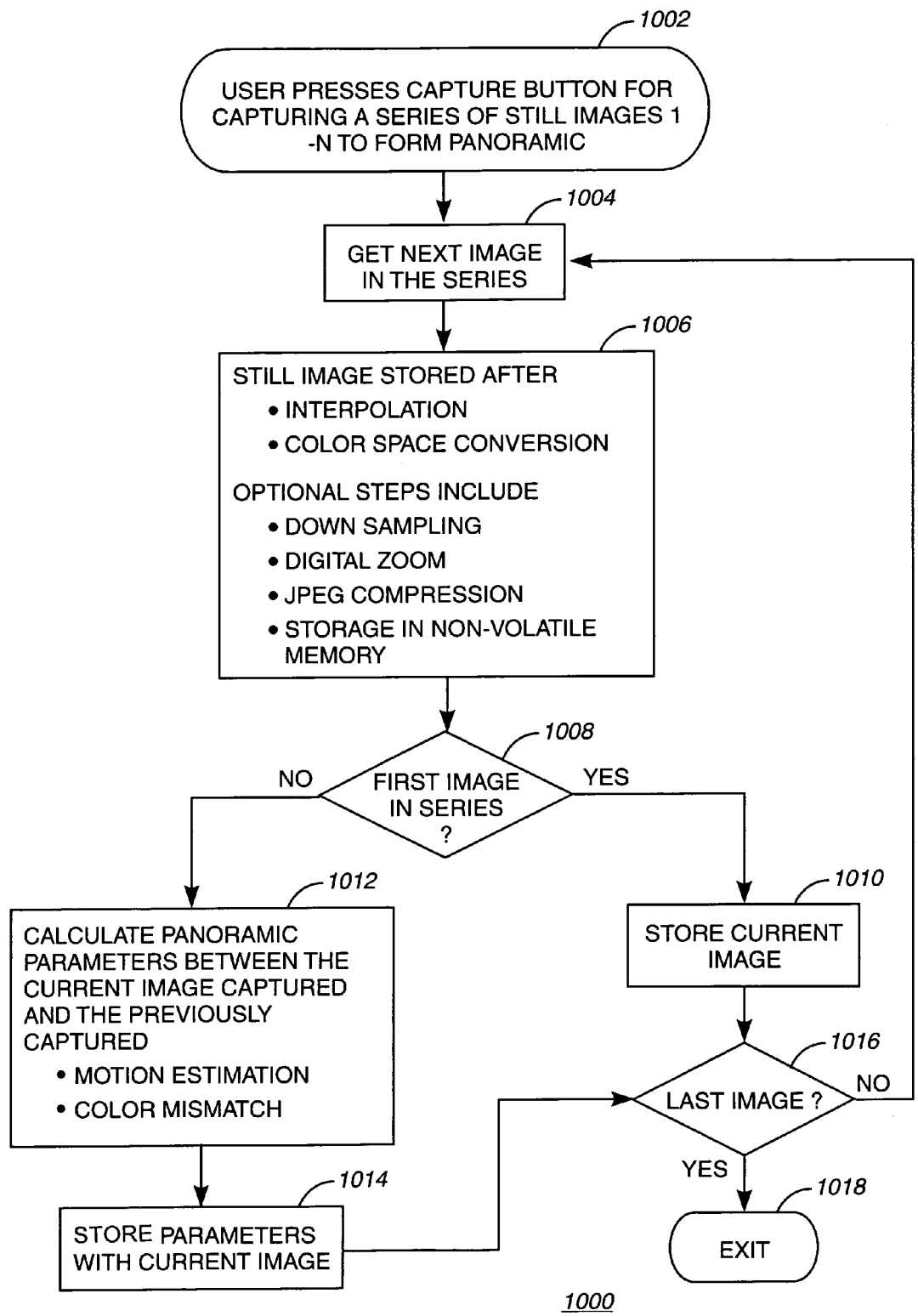
FIG. 10 is a flow diagram of the still pictures capture and storage and of the panorama parameters computation, according to the present invention.

FIG. 10 is a flow diagram of the still pictures capture and storage and of the panorama parameters computation, according to the present invention. The process begins with a user selecting a panoramic mode and begins to capture a series of still images 1-N, step 1002 and the user gets the new image in the sequence, step 1004. The still image captured is stored after steps of including interpolation, color space conversion and optional steps such as down sampling, digital zoom, JPEG compression and storage into non-volatile memory, step 1006. A test is made to determine if the Current Image is the first in a series, step 1008. If the Current Image is indeed the first image in a series then the current image is stored as usual, step 1010. If on the other hand, the Current Image, is not the first image of a series, then parameters are calculated between the Current Image and Previous Image which include motion estimation and color mismatch, step 1012. Next, in step 1014, the Current Image is stored with the calculated parameters, step 1014. If, in step 1016 it is determined that the current image is the last in the series, t, the process ends in step 1018 otherwise the process loops back to get the next image in the series.

Storage Format for the Panoramic Image

Figure 11:
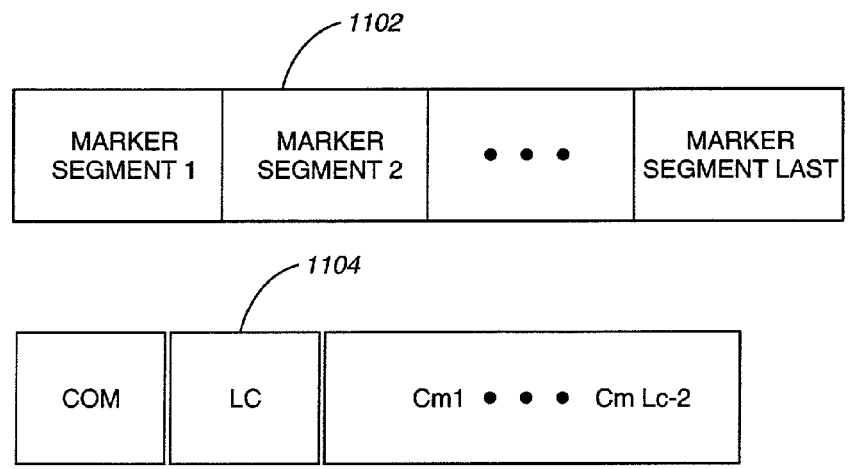
FIG. 11 is a block diagram of storage format that is compatible with existing JPEG formats according to the present invention.

FIG. 11 is a block diagram 1100 of storage format that is compatible with existing JPEG formats, according to the present invention. Shown is a table, according to the ISO DIS 10918 specification for JPEG, which can be found in the book, "JPEG Still Image Data Compression", by William B. Pennebaker and Joan L. Mitchell and published by Van Nostrand Reinhold, N.Y. The marker segments 1102, or more formally known as the miscellaneous marker segments, may be presented in any order with no limit on the number of segments (i.e., marker segmentlast). The marker segments 1102 typical includes:

quantization table_specification;
Huffman table_specification;
arithmetic conditioning table_specification;
restart definition; comment; or
application data.

If the marker segments 1102 repeat any previous marker segments, the subsequent marker segments replaces the previous marker segments.

The structure of each marker segments 1102 is shown in 1104. The syntax shown is as follows:

COM: _ comment marker; marks beginning of a comment.
Lc: _ comment segment length; specific the length of the comment segment.
Cmi: _ comment byte; the interpretation is left to the application.

Exemplary parameters sizes and values for the segments 1102 are shown in the table below:

| PARAMETER | SIZE (BITS) | SEQUENTIAL DCT BASELINE EXTENDED | PROGRESSIVE DCT | LOSS-LESS |
|---|---|---|---|---|
| Lc | 16 | | 2–65535 | |
| Cmi | 8 | | 0–255 | |

By storing images captured using the panoramic camera of FIG. 1 the panoramic playback parameters used for motion estimation are stored in each marker segment 1104. The parameters used in panoramic playback include the motion estimation/displacements parameters, color parameter, focal length parameters. In addition, an index for each picture is stored. The index can be comprised of a unique seed value for a given series of pictures along with the number of the 1 of 4, 2 of 4, and so on. It is important to note that the index described is as an example only and other index types that provide the relationship between successive still images can be used.

In another embodiment, a unique name is given to each picture combined with the index to provide the user sufficient information during the process of playing back the panoramic.

Although the JPEG standard is shown in this image storage format, other still image storage formats that have comment fields such as GIF (Graphics Interchange Format), BMP (bitmaps), TIFF (Tag Image File Format) and other image formats. It should be understood that by using the comment fields in the image formats, the original still image can be stored along with panoramic playback parameters. The still image is then not only compatible with the selected standard still image formats for display, but the image can also be played backed using the panoramic parameters as described below. In addition, during the playback, because each image in the series has been stored without modification but with all parameters allowing a fast reconstruction of the panoramic picture, the user is able, if needed, to manually adjust these parameters to correct imperfection in the panoramic reconstruction.

Overview of Playing Back the Panoramic Image

Figure 12:
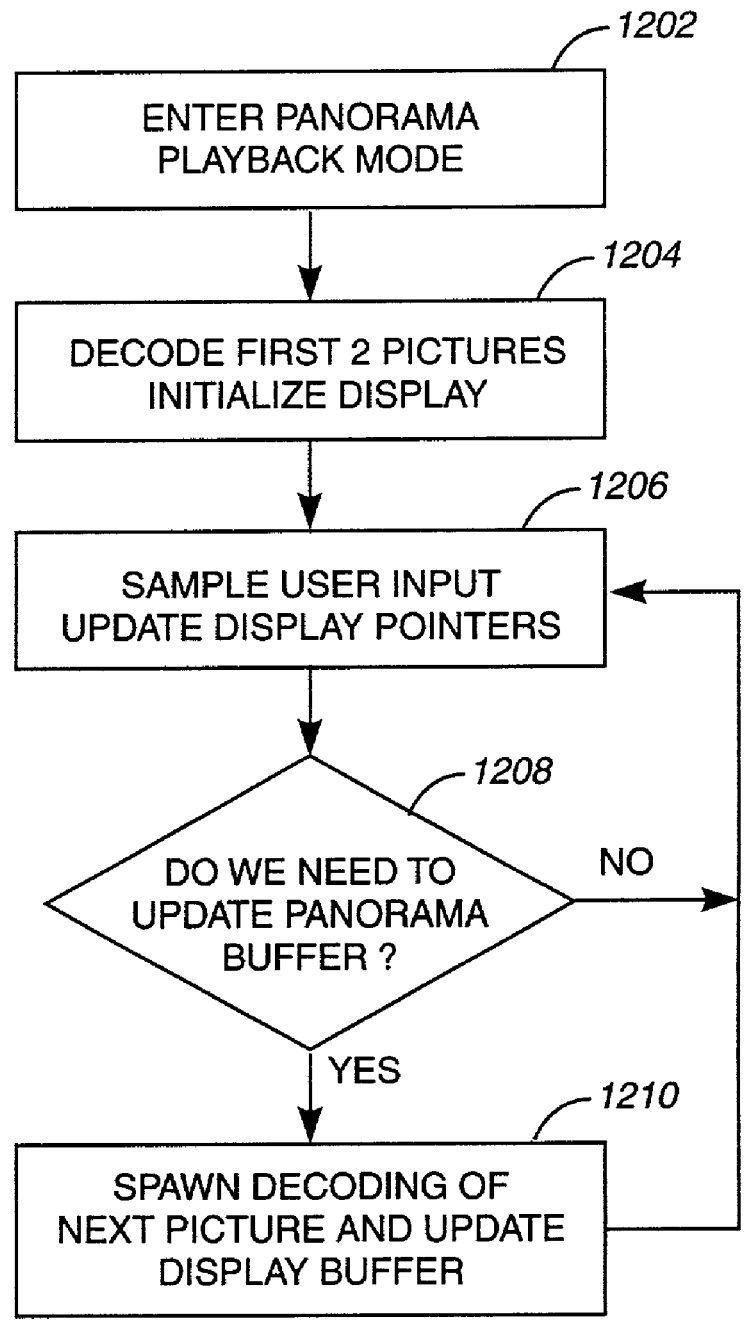
FIG. 12 is a flow diagram of overall image stitching process used for panoramic playback according to the present invention.

Turning now to FIG. 12, shown is a flow diagram 1200 of overall image stitching process used for panoramic playback according to the present invention. The process begins with the user selecting the panoramic playback mode in step 1202 via the user interface 136 of digital camera 100. Two pictures previously stored, as detailed in FIG. 9 and the paragraph above, are retrieved from memory, step 1204. The two images retrieved and decoded and down sampled to the display format (typically from 4 or 2 Mpels down to 704×480) and stitched together in the circular display buffer as described further below. The user is then presented with a partial view of the panorama, which is centered on the overlap of the two first pictures. In one embodiment, the two pictures presented are the center of panoramic presented in partial view. The current invention is not restricted to single dimensional panoramic (i.e., Vertical and Horizontal Panoramic) but is compatible with two-dimensional panoramic where the panorama is both wider and taller than its constituting pictures. In another embodiment, a two dimensional panoramic is used where four pictures are retrieve and decoded, instead of two as describe above. The four pictures presented are the center of the panoramic for a two dimensional panoramic. Next, a determination is made in step 1206 of which way the user is scrolling. For a one-dimensional scroll this is either left-to-right, right-to-left, top-to-bottom, bottom-to-top. In a two-dimensional scroll there are both horizontal and vertical buttons. As the image is scrolled, the pointers to the buffer are updated. Secondly, if the scroll is far enough away from the current position, in step 1208, the next image or images needed are fetched and placed into the two-dimensional circular buffer as described in U.S. Pat. No. 6,801,219, entitled "Method And Apparatus Using A Two-Dimensional Circular Data Buffer For Scrollable Image Display" as identified in the Cross Reference Section of this patent application and the decoding of the next still image is started in step 1210. If the scroll is such that it does not require the circular buffer to be updated, the process returns to step 1206.

In summary, this process flow 1200 is a real-time loop that samples user input to determine which way the panorama is scrolled and updates the display pointers accordingly for the two-dimensional circular buffer. When the display view port approaches the edge of the partially reconstructed panorama the next picture is decoded and stitched into the panorama buffer. This action can be spawned so that control returns immediately to the user. A new decoding can start only when the current one finishes. This constraint determines the maximum scrolling speed. The two-dimensional circular buffer update must be started sufficiently ahead of time so that the update is finished before the user scrolls to this part of the panorama. This is a function of scroll speed, decoding, stitching latency, and the size of the two-dimensional circular buffer. The time critical operation here is the decoding and stitching of successive pictures as the user scrolls through the panorama. These steps are described more in detail in the following.

Figure 13:
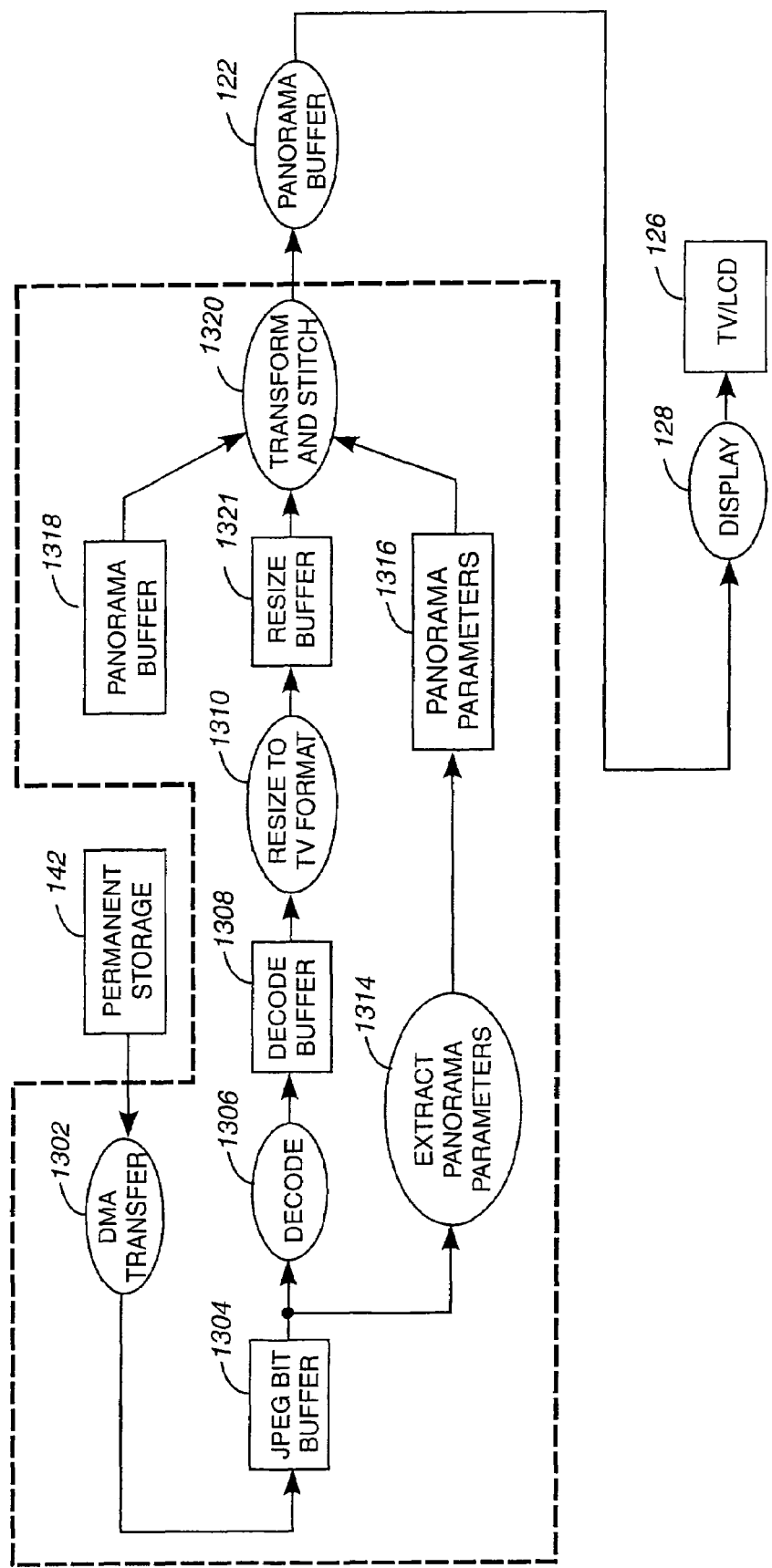
FIG. 13 is functional block diagram for the panoramic playback of flow diagram FIG. 12 through the display hardware of FIGS. 1 and 2, according to the present invention.

FIG. 13 is functional block diagram 1300 for the panoramic playback of flow diagram FIG. 12 through the display hardware 126 of FIGS. 1 and 2, according to the present invention. The first two images as described in step 1204 are retrieved from storage 142 (such as flash memory or a hard disk drive) and using the components as described above for FIGS. 1 and 2, the picture stitching device 124, the picture processor 120, DSP 134, serial I/O 136, image CODEC 132, LCD preview and display 126, PAL/NTSC encoder 130 and LCD controller & drivers 126, the two images using DMA transfer 1302 are placed in a JPEG bit buffer 1304. From the JPEG bit buffer 1304, the two images are decoded and resized or down sampled to the display format (typically from 4 or 2 Mpels down to the resolution of the display 126 such as 704×480), in blocks 1306, 1308, 1310 and 1321. At the same time, panorama parameters are extracted in step 1314 from the JPEG bit buffer 1304 and made available for stitching, in step 1316. In the stitching step, 1318, current information in the two-dimensional circular buffer 1318 combined with the image in the resized buffer 1312 and combined with the panoramic parameters 1316 are used to stitch the images together, 1320, and place them back into the two-dimensional circular buffer 1318. The two-dimensional circular buffer can be frame implemented as frame buffers 122 in FIGS. 1 and 2. A display driver 128 renders the resulting image to the TV or LCD display 126. It is important to note that all the functional blocks shown in FIG. 13 are exemplary only and the other combinations of functional blocks, including temporary buffers 1304, 1312, and 1316 can be combined or further separated within the true scope and spirit of the present invention.

It should be understood that use of the present invention reduces the storage requirement of the prior art panoramic image storage where both the individual panoramic pictures as well as the individual panoramic strips i.e., pictures N−1 . . . N . . . N+1. The present invention successive images are saved like any non-panoramic still image capture, however the motion estimation and color correction parameters are computed and stored with each picture. These stored parameters are later used when the panorama is created. In addition, the user can interact with the digital still camera and help work around any imperfections of the panoramic stitching algorithm such as motion estimation, in order to produce a better panoramic image.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for storing a plurality of still images to form a panoramic image, the method comprising the steps of:
   receiving a first image forming a part of a series of images to form a panoramic image;
   storing the first image in memory;
   receiving one or more subsequent images and for each of the images received performing the sub-steps of
      calculating one or more panoramic parameters including motion estimation and color correction between a current image and a previous image stored in memory; and
      storing the current image with the one or more panoramic parameters in memory, wherein the one or more panoramic parameters are also stored in a field of a compressed image format reserved for at least one of comments and extensions so as to preserve the stored image file compatibility with other images stored without the one or more panoramic parameters.

2. The method of claim 1, wherein the step of storing the current image with one or more panoramic parameters includes storing the current image in an image format selected from the group of image formats consisting of JPEG file format as defined by ISO DIS 10918, BMP file format, and Tagged lmage File Format (TIFF).

3. The method of claim 1, wherein the step storing the current image with one or more panoramic parameters includes storing the current image in non-volatile memory.

4. The method of claim 1, wherein the step of storing the current image with one or more panoramic parameters includes storing the panoramic parameters in a comment field of an image format.

5. The method of claim 1, wherein the step of storing the current image with one or more panoramic parameters includes storing the panoramic parameters in a marker segment of a JPEG image format as defined by ISO DIS 10918.

6. The method of claim 1, wherein the step of storing the current image with one or more panoramic parameters includes storing an index value representing a sequence number of the current image in the series of images.

7. The method of claim 1, wherein the step of storing the current image with one or more panoramic parameters includes storing any one of the parameters of displacement, color, and focal length.

8. The method of claim 1, further comprising the steps of:
   playing back the plurality of still images stored to form a panoramic image comprising the sub-steps of:
      retrieving one or more images from memory; and
      stitching the one or more images together to form a panoramic image using the one or more panoramic parameters previously stored in memory.

9. The method of claim 8, where in the step of playing back the plurality of still images includes the sub-steps of:
   decoding the one or more images from a given image format; and
   down sampling the one or more images to fit a given display format.

10. The method of claim 1, wherein the step of receiving one or more subsequent images further comprises:
   aligning a current image with a prior image by using a preview strip.

11. A computer readable storage medium containing programming instructions for storing a plurality of still images to form a panoramic image from a digital camera, the programming instructions comprising:
   receiving a first image forming a part of a series of images to form a panoramic image;
   storing the first image in memory;
   receiving one or more subsequent images and for each of the images received performing the programming instructions of
      calculating one or more panoramic parameters including motion estimation and color correction between a current image and a previous image stored in memory; and
      storing the current image with the one or more panoramic parameters in memory, wherein the one or more panoramic parameters are also stored in a field of a compressed image format reserved for at least one of comments and extensions so as to preserve the stored image fife compatibility with other images stored without the one or more panoramic parameters.

12. The computer readable storage medium of claim 11, wherein the programming instruction of storing the current image with one or more panoramic parameters includes storing the current image in an image format selected from the group of image formats consisting of JPEG file format as defined by ISO DIS 10918, BMP file format, and Tagged Image File Format (TIFF).

13. A picture-stitching device for storing a plurality of still images to form a panoramic image, the device comprising:
   an interface to memory for holding a plurality of still images to form a panoramic;
   a first image received in memory which forms a part of a series of images to form a panoramic image;
   one or more subsequent images received in a buffer;
   an interface to a processor for calculating one or more panoramic parameters including motion estimation and color correction for each one or more subsequent images received into memory, calculating one or more panoramic parameters between a current image and a previous image stored in memory; and
   wherein the current image with the one or more panoramic parameters are stored in memory,
   wherein the one or more panoramic parameters are also stored in a field of a compressed image format reserved for at least one of comments and extensions so as to preserve the stored image file compatibility with other images stored without the one or more panoramic parameters.

14. The device of claim 13, wherein the more panoramic parameters includes storing the current image in an image format selected from the group of image formats consisting of JPEG file format as defined by ISO DIS 10918, BMP file format, and Tagged Image File Format (TIFF).

15. The device of claim 13, wherein the interface to memory includes an interface to non-volatile memory.

16. The device of claim 13, wherein the one or more panoramic parameters are stored in a comment field of an image format.

17. The device of claim 13, wherein the one or more panoramic parameters are stored in a marker segment of a JPEG image format JPEG as defined by ISO DIS 10918.

18. The device of method of claim 13, wherein the one or more panoramic parameters are stored with an index value representing a sequence number of the current image in the series of images.

19. The device of claim 13, wherein the one or more panoramic parameters includes any one of the parameters of displacement, color, and focal length.

* * * * *